(12) United States Patent
Akahane et al.

(10) Patent No.: US 11,652,936 B2
(45) Date of Patent: May 16, 2023

(54) RECORDING DEVICE

(71) Applicant: SEIKO EPSON CORPORATION, Tokyo (JP)

(72) Inventors: Hisayuki Akahane, Matsumoto (JP); Shintaro Miyamoto, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 87 days.

(21) Appl. No.: 17/236,711

(22) Filed: Apr. 21, 2021

(65) Prior Publication Data
US 2021/0337078 A1  Oct. 28, 2021

(30) Foreign Application Priority Data

Apr. 23, 2020  (JP) ............................. JP2020-076569

(51) Int. Cl.
*H04N 1/00* (2006.01)
*B41J 29/13* (2006.01)
*B41J 29/02* (2006.01)

(52) U.S. Cl.
CPC .......... *H04N 1/00554* (2013.01); *B41J 29/02* (2013.01); *B41J 29/13* (2013.01); *H04N 1/00559* (2013.01)

(58) Field of Classification Search
CPC . H04N 1/00554; H04N 1/00559; B41J 29/02; B41J 29/13; B41J 2/17509; B41J 2002/17573; B41J 2/1752; B41J 2/17553; B41J 2/17566; B41J 2/01

USPC .............................................................. 347/3
See application file for complete search history.

(56) References Cited

U.S. PATENT DOCUMENTS

| | | | |
|---|---|---|---|
| 2001/0017438 A1* | 8/2001 | Takamtsu | ............. H04N 1/0058 271/3.14 |
| 2014/0146493 A1* | 5/2014 | Nagashima | .............. B41J 29/02 361/752 |
| 2017/0251117 A1 | 8/2017 | Shirota et al. | |

FOREIGN PATENT DOCUMENTS

| | | |
|---|---|---|
| CN | 105078132 A | 11/2015 |
| JP | 2008073868 A | 4/2008 |
| JP | 2017149096 A | 8/2017 |
| JP | 2019193232 A | 10/2019 |

* cited by examiner

*Primary Examiner* — Christopher E Mahoney
*Assistant Examiner* — Alexander D Shenderov
(74) *Attorney, Agent, or Firm* — Chip Law Group

(57) ABSTRACT

A recording device includes a housing including a recording mechanism unit configured to perform recording on a target recording medium, and a recording mechanism unit cover configured to rotate, by a rotational shaft along a first side surface of the housing, between an open state of an upper surface of the housing being open and a closed state of the upper surface of the housing being closed. The recording mechanism unit cover is configured to be inside the housing in the closed state and a second side surface and a third side surface of the recording mechanism unit cover that intersect the first side surface of the housing in the closed state are provided with a rib configured to support a second side surface or a third side surface of the housing that intersects the first side surface of the housing.

22 Claims, 12 Drawing Sheets

RECORDING DEVICE

The present application is based on, and claims priority from JP Application Serial Number 2020-076569, filed Apr. 23, 2020, the disclosure of which is hereby incorporated by reference herein in its entirety.

BACKGROUND

1. Technical Field

The present disclosure relates to a recording device.

2. Related Art

Recording devices including a scanner configured to scan an image or the like have been known. JP-A-2017-149096 discloses a recording device that includes a recording mechanism unit configured to perform recording on a target recording medium and a scanning mechanism unit configured to scan an original document, and has a configuration in which a main body portion of the scanning mechanism unit enters inside a housing upper portion of the recording mechanism unit.

Nevertheless, the recording device described in JP-A-2017-149096 has a configuration in which the scanning mechanism unit rotatably opens and closes with respect to the housing of the recording mechanism unit and enters an inner surface of the housing upper portion of the recording mechanism unit, making it difficult to provide a member configured to support an upper portion of a housing side surface and resulting in the possibility of inward deformation of the housing side surface.

SUMMARY

A recording device includes a housing including a recording mechanism unit configured to perform recording on a target recording medium, and a recording mechanism unit cover configured to rotate, by a rotational shaft along a first side surface of the housing, between an open state of an upper surface of the housing being open and a closed state of the upper surface of the housing being closed. The recording mechanism unit cover is configured to be inside the housing in the closed state and a second side surface and a third side surface of the recording mechanism unit cover that intersect the first side surface of the housing in the closed state are provided with a rib configured to support a second side surface or a third side surface of the housing that intersects the first side surface of the housing.

A recording device includes a housing including a recording mechanism unit configured to perform recording on a target recording medium, and a recording mechanism unit cover configured to rotate, by a rotational shaft along a first side surface of the housing, between an open state of an upper surface of the housing being open and a closed state of the upper surface of the housing being closed. The recording mechanism unit cover is configured to be inside the housing in the closed state, at least one of a second side surface and a third side surface of the recording mechanism unit cover that intersect the first side surface of the housing in the closed state, and the second side surface and the third side surface of the housing that intersect the first side surface of the housing is provided with a rib configured to support the second side surface or the third side surface of the housing or the recording mechanism unit cover, the housing includes a notch portion in the second side surface and the third side surface of the housing that intersect the first side surface of the housing, and the recording mechanism unit cover includes a protruding portion exposed from the notch portion and protruding from the second side surface and the third side surface of the recording mechanism unit cover and a recessed portion recessed in a concave shape on a lower side of the protruding portion.

DESCRIPTION OF EXEMPLARY EMBODIMENTS

1. First Exemplary Embodiment

A schematic configuration of a recording device 10 according to a first exemplary embodiment will now be described. The recording device 10 is, for example, an ink jet-type printer including a scanner configured to scan an original document or the like. In the coordinate system added to the drawings, three imaginary axes orthogonal to each other are referred to as an X-axis, a Y-axis, and a Z-axis, with the recording device 10 being placed on a horizontal installation surface. The Y-axis is an axis parallel with a front-back direction of the recording device 10, and a tip side of the arrow indicating the Y-axis is referred to as "front". The X-axis is an axis parallel with a left-right direction of the recording device 10, and a tip side of the arrow indicating the X-axis is referred to as "left". The Z-axis is an axis parallel with an up-down direction of the recording device 10, and a tip side of the arrow indicating the Z-axis is referred to as "up". Further, the tip side of the arrow indicating each axis is referred to as a "positive side" and a base end side is referred to as a "negative side".

1-1. Configuration of Recording Device

Figure 1:
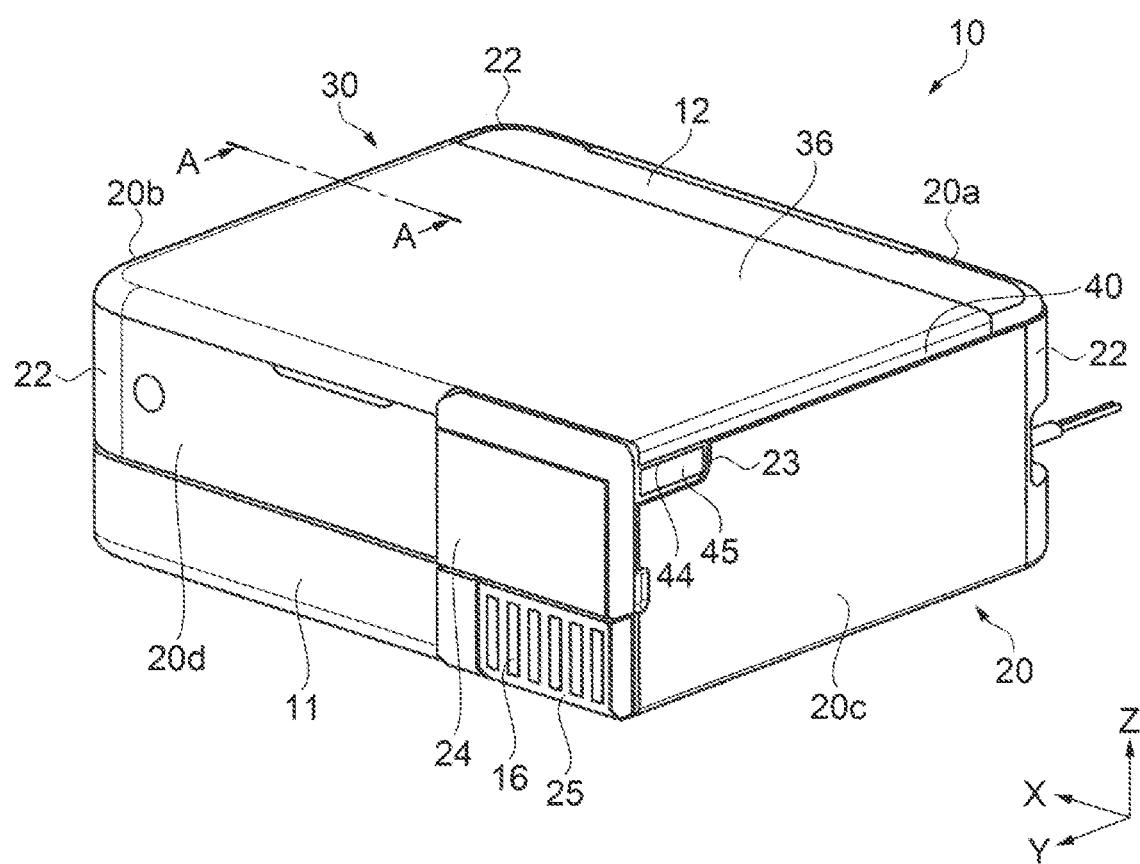
FIG. 1 is a perspective view illustrating a configuration of a recording device according to a first exemplary embodiment.
Figure 2:
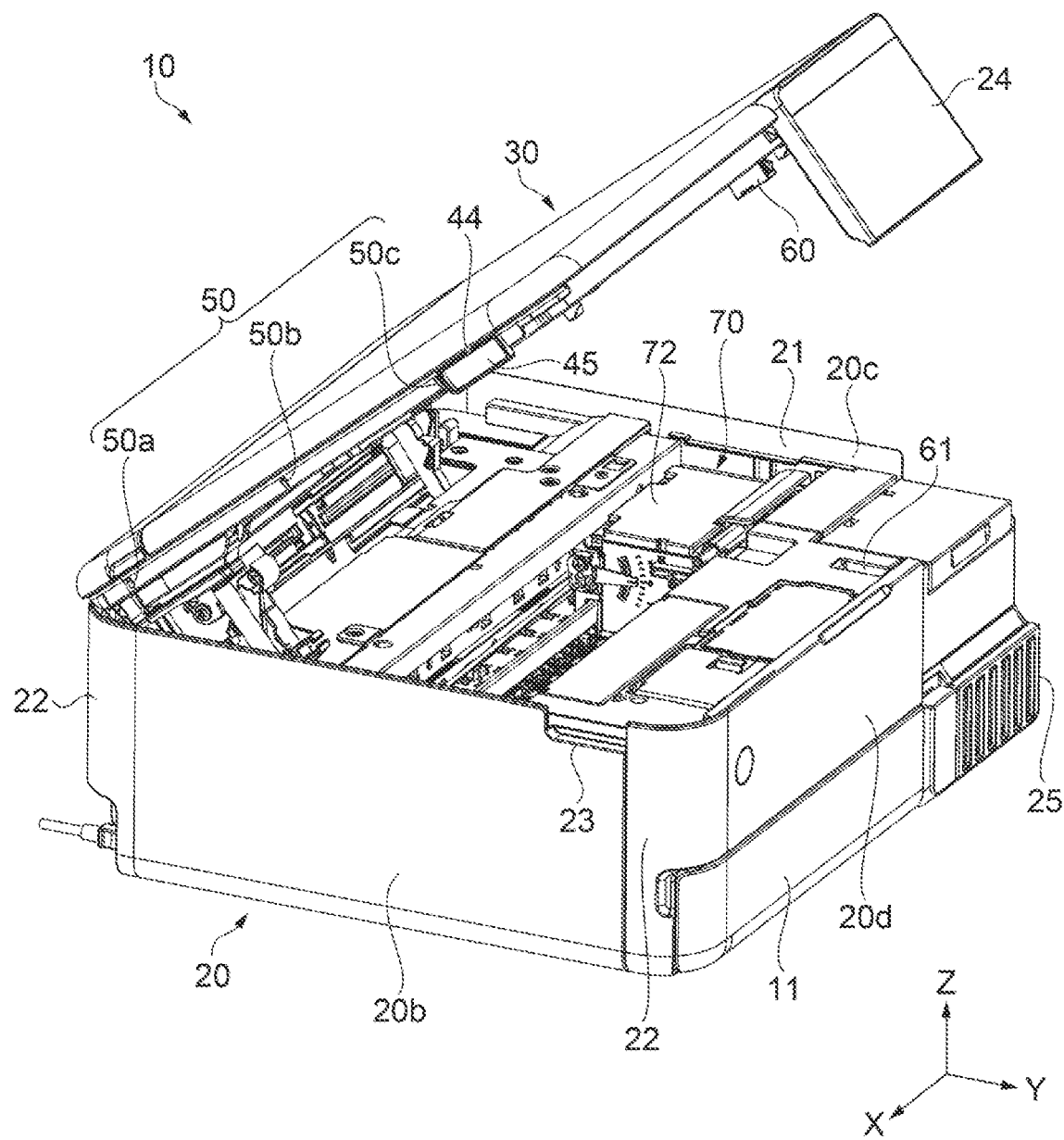
FIG. 2 is a perspective view illustrating the recording device with a recording mechanism unit cover in an open state.

As illustrated in FIG. 1 and FIG. 2, the recording device 10 includes a housing 20 having a rectangular parallelepiped shape. The housing 20 includes a first side surface 20a, a second side surface 20b and a third side surface 20c that intersect the first side surface 20a, and a fourth side surface 20d that faces the first side surface. The first side surface 20a of this exemplary embodiment is a back face of the housing 20, the second side surface 20b is a left side face of the housing 20, the third side surface 20c is a right side face of the housing 20, and the fourth side surface 20d is a front face of the housing 20. The second side surface 20b and the third side surface 20c of the housing 20 include a curved surface 22 that curves toward at least one of the first side surface 20a and the fourth side surface 20d of the housing 20. The second side surface 20b of this exemplary embodiment includes the curved surfaces 22 that curves toward the first side surface 20a and the fourth side surface 20d, and is coupled to the first side surface 20a and the fourth side surface 20d. The third side surface 20c includes the curved surface 22 that curves toward the first side surface 20a, and is coupled to the first side surface 20a and the fourth side surfaces 20d. Thus, the second side surface 20b and the third side surface 20c including the curved surfaces 22 are each integrally formed.

Figure 4:
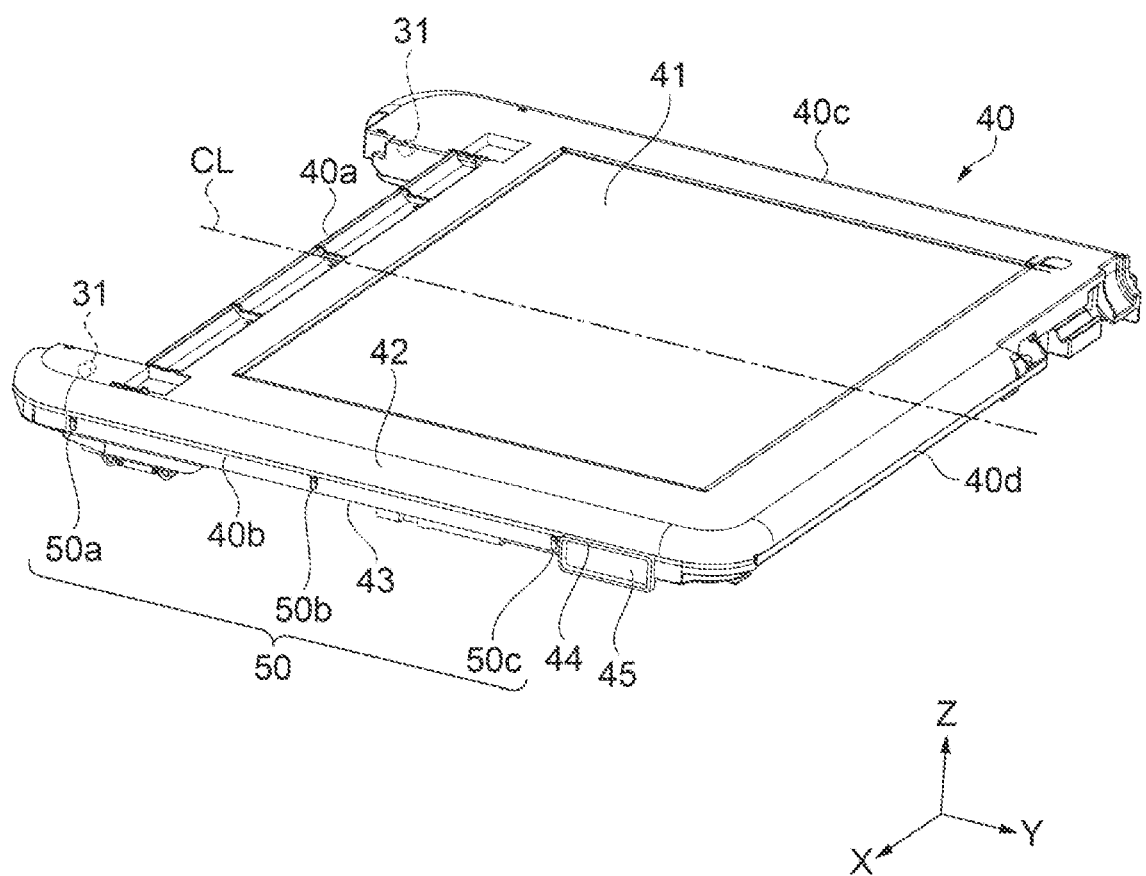
FIG. 4 is a perspective view illustrating a configuration of a main body portion.

An upper surface of the housing 20 is covered by a recording mechanism unit cover 30 in an openable and closable manner. A rotational shaft 31 that couples the housing 20 and the recording mechanism unit cover 30 is provided to an upper end portion of the housing 20 on the positive side in the Z direction along the first side surface 20a. As illustrated in FIG. 4, the rotational shaft 31 of this exemplary embodiment is provided along a first side surface 40a of a main body portion 40 constituting the recording mechanism unit cover 30 described later. The recording mechanism unit cover 30 rotates, by the rotational shaft 31, to an open state in which the upper surface of the housing 20 is open and a closed state in which the upper surface of the housing 20 is closed. A portion of the recording mechanism unit cover 30 is configured to enter an interior of the housing 20 in the closed state. Accordingly, in the closed state, a portion of the recording mechanism unit cover 30 is surrounded by inner surfaces 21 of the first to fourth side surfaces 20a to 20d of the housing 20.

Figure 3:
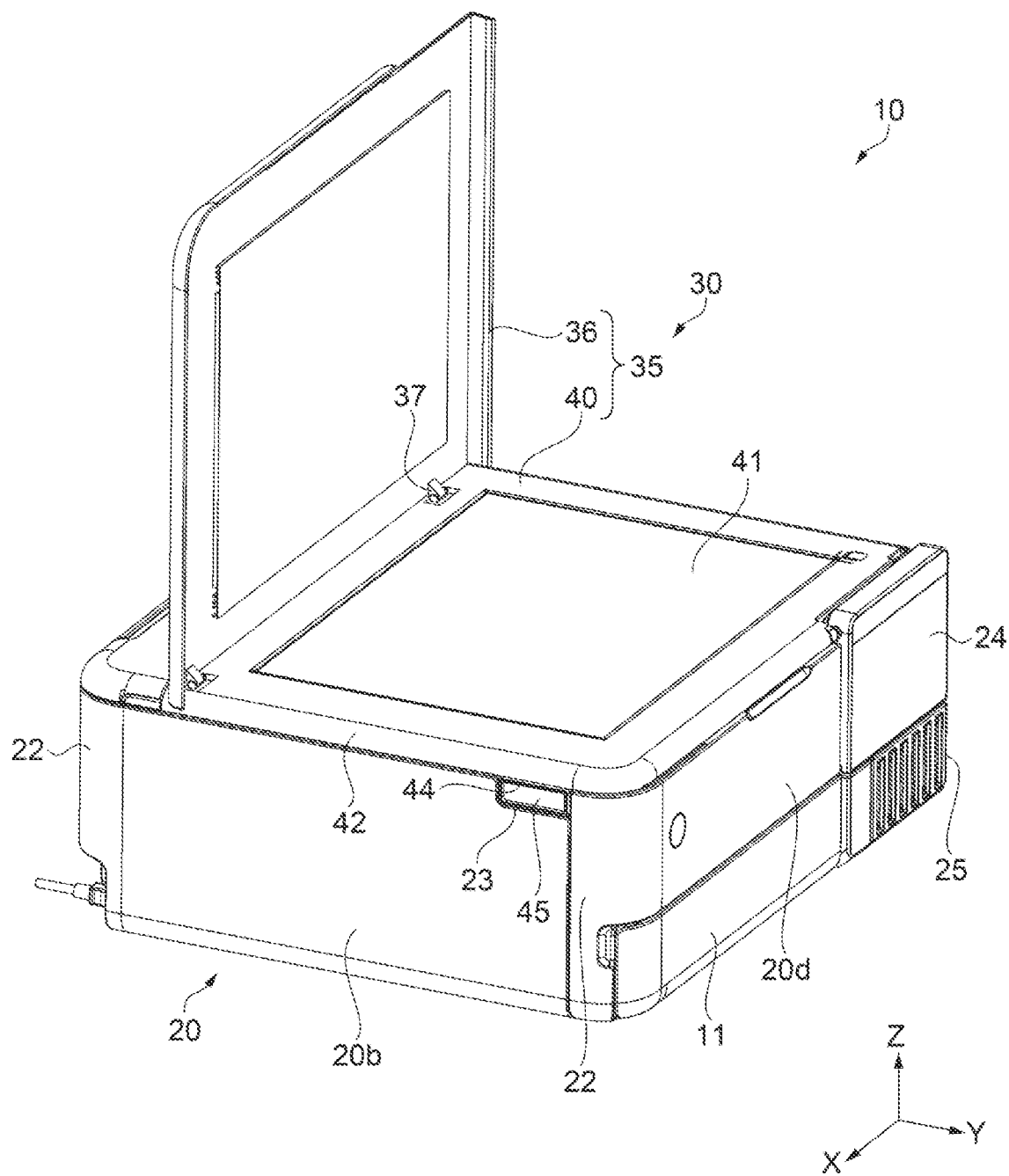
FIG. 3 is a perspective view illustrating the recording device with a scanner bed cover in an open state.

As illustrated in FIG. 3 and FIG. 4, the recording mechanism unit cover 30 according to this exemplary embodiment includes a scanner unit 35 configured to scan an original document on which characters, images, and the like are recorded. The scanner unit 35 includes the main body portion 40 provided with a scanner bed 41 for placement of the original document, and a scanner bed cover 36 configured to cover the scanner bed 41 in an openable and closable manner. That is, in the closed state of the recording mechanism unit cover 30, a portion of the main body portion 40 is surrounded by the inner surfaces 21 of the first to fourth side surfaces 20a to 20d of the housing 20. The main body portion 40 includes an upper case 42 and a lower case 43. The main body portion 40 includes the first side surface 40a parallel with the first side surface 20a of the housing 20, a second side surface 40b and a third side surface 40c that intersect the first side surface 40a, and a fourth side surface 40d that faces the first side surface 40a. The first side surface 40a of this exemplary embodiment is a back face of the recording mechanism unit cover 30, the second side surface 40b is a left side face of the recording mechanism unit cover 30, the third side surface 40c is the right side face of the recording mechanism unit cover 30, and the fourth side surface 40d is a front face of the recording mechanism unit cover 30.

The second side surface 40b and the third side surface 40c of the main body portion 40 constituting the recording mechanism unit cover 30 are coupled to at least one of the first side surface 40a and the fourth side surface 40d that intersect the second side surface 40b and the third side surface 40c of the recording mechanism unit cover 30. The second side surface 40b of this exemplary embodiment is coupled to the fourth side surface 40d, and the third side surface 40c is coupled to the fourth side surface 40d. The recording mechanism unit cover 30 may have a configuration in which the second side surface 40b is coupled to the first side surface 40a, a configuration in which the second side surface 40b is coupled to the first side surface 40a and the fourth side surface 40d, a configuration in which the third side surface 40c is coupled to the first side surface 40a, or a configuration in which the third side surface 40c is coupled to the first side surface 40a and the fourth side surface 40d.

The scanner bed 41 is formed of, for example, a transparent glass plate, and a periphery thereof is surrounded by the upper case 42. An imaging module configured to convert the characters, images, and the like of the original document placed on the scanner bed 41 into electrical signals is provided between the upper case 42 and the lower case 43. The imaging module includes a line-type image sensor, a light source, a lens, and the like of a close contact optical system long in a width direction of the medium.

A rotational shaft 37 that couples the main body portion 40 and the scanner bed cover 36 is provided to the first side surface 40a of the main body portion 40. The scanner bed cover 36 rotates, by the rotational shaft 37, to an open state in which an upper surface of the scanner bed 41 is open and a closed state in which the upper surface of the scanner bed 41 is closed. The scanner bed cover 36 of this exemplary embodiment constitutes an upper surface of the recording device 10 in the closed state.

As illustrated in FIG. 1, in a side view from the X direction, the recording device 10 according to this exemplary embodiment is configured with one seam by the scanner bed cover 36 and the second side surface 20c being visible. That is, excluding a protruding portion 44 and a recessed portion 45 described later, of the side surfaces of the scanner bed 41 in the X direction, portions on the negative side in the Z direction are covered by the second side surface 40b and the third side surface 40c of the housing 20, and portions on the positive side in the Z direction are covered by the scanner bed cover 36. Therefore, when the recording mechanism unit cover 30 is brought into the open state with respect to the housing 20 and when the scanner bed cover 36 is brought into the open state with respect to the scanner bed 41, the recording mechanism unit cover 30 and the scanner bed cover 36 are separated from the housing 20 or the scanner bed 41, widening this seam. Note that the scanner bed 41 may constitute the same plane as the second side surface 40b of the housing 20 and the scanner bed cover 36, making the seam between the housing 20 and the recording mechanism unit cover 30 and the seam between the scanner bed 41 and the scanner bed cover 36 separate.

As illustrated in FIG. 1 to FIG. 3, the recording mechanism unit cover 30 includes an operation unit 24 rotatably coupled to the scanner bed 41. The operation unit 24 is a liquid crystal panel including a display function and an input function, and is provided rotatable to the right side of the fourth side surface 40d of the main body portion 40. That is, the operation unit 24 is rotatable along with the main body portion 40 with respect to the housing 20, and is configured to be rotatable with respect to the main body portion 40. The operation unit 24 can form the same plane as the fourth side surface 20d of the housing 20 with the recording mechanism unit cover 30 in the closed state, and a lower end portion of the operating unit 24 can be tilted upward while the recording mechanism unit cover 30 is maintained in the closed state. Thus, an aesthetic appearance of the recording device 10 is improved, and a visibility and an operability of the operation unit 24 are improved.

A liquid accommodating container 16 configured to accommodate a liquid supplied to the recording head 71 is provided in the interior of the housing 20. A viewing window 25 for visually recognizing an amount of liquid accommodated in the liquid accommodating container 16 is provided on a lower side of the operation unit 24 on the fourth side surface 20d of the housing 20.

Figure 6:
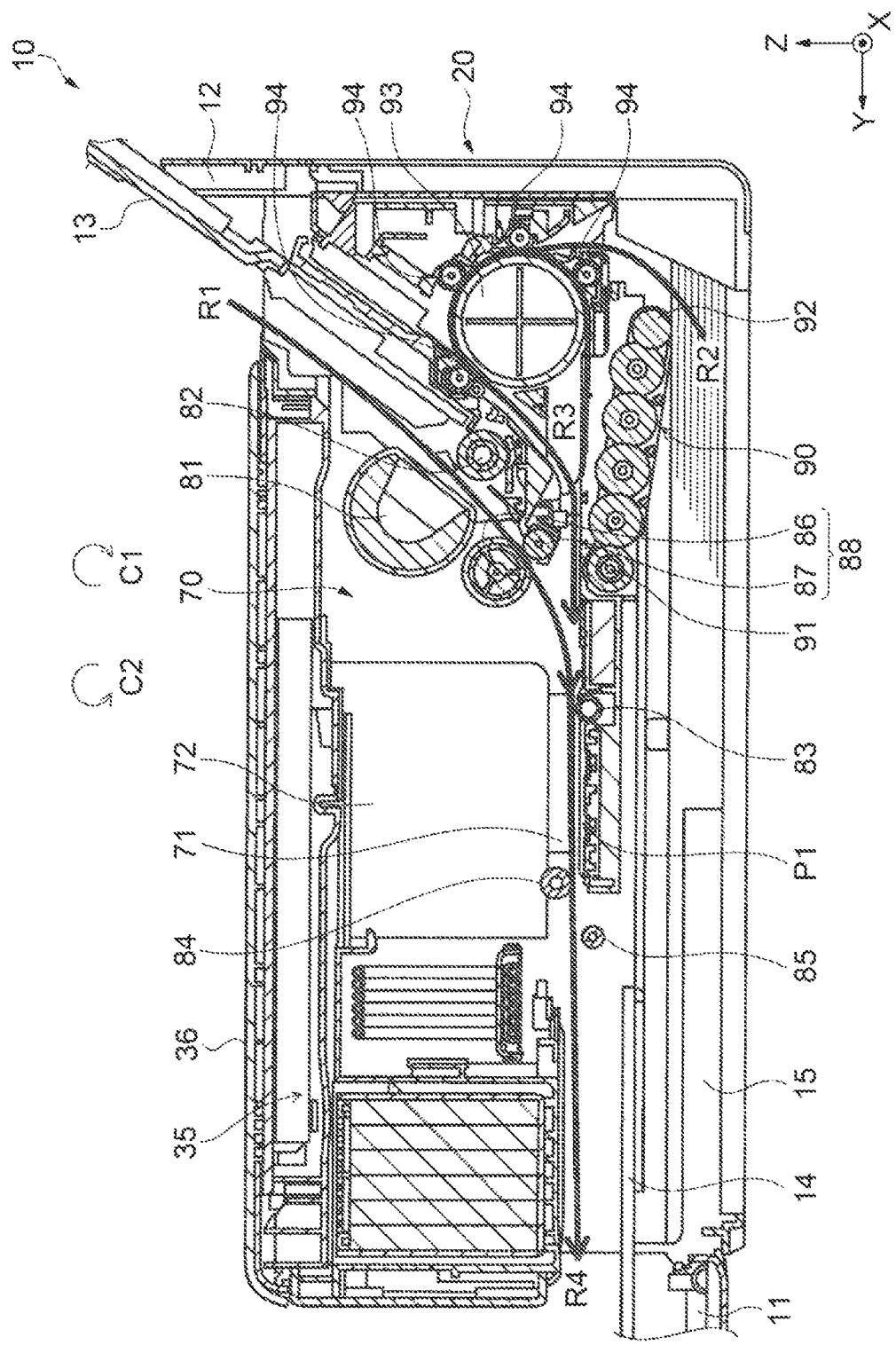
FIG. 6 is a cross-sectional view illustrating an internal configuration of the recording device.

As illustrated in FIG. 6, the recording device 10 includes a recording mechanism unit 70 configured to perform recording on a target recording medium in the interior of the housing 20. Note that, in the following description, the target recording medium is simply referred to as a medium. The recording mechanism unit 70 includes various rollers configured to transport the medium along a transport path, the recording head 71 configured to eject a liquid onto the medium, and the like.

As illustrated in FIG. 1, the recording device 10 includes a front cover 11 on a lower side of the fourth side surface 20d of the housing 20. Further, the recording device 10 includes a rear cover 12 on an upper surface of the housing 20 along the first side surface 20a.

Figure 5:
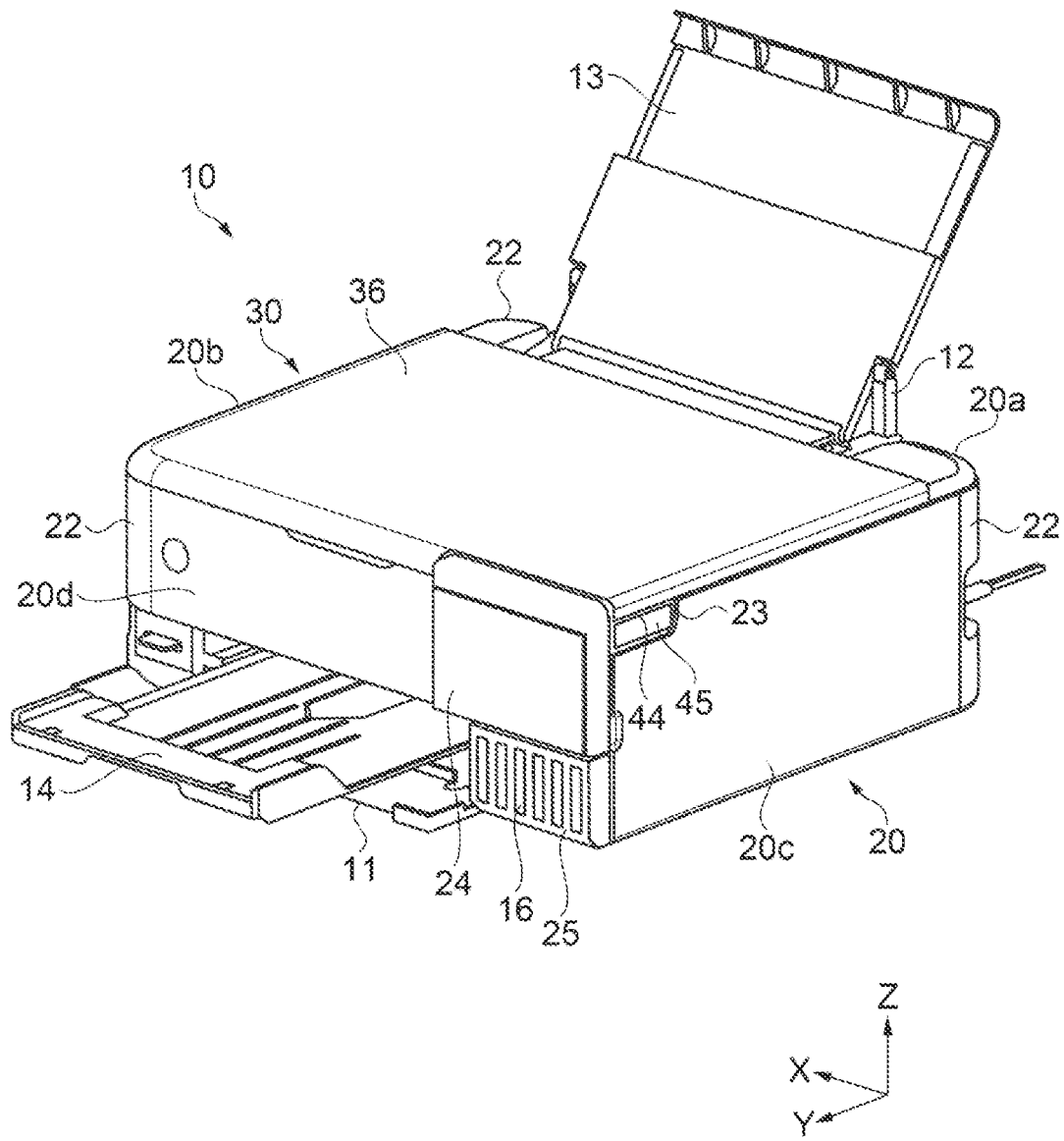
FIG. 5 is a perspective view illustrating the recording device with a feeding tray and a discharge tray pulled out.

As illustrated in FIG. 5 and FIG. 6, the recording device 10 has a configuration in which recording can be performed on a medium set in a feeding tray 13 by opening the front cover 11 and the rear cover 12 and pulling out the feeding tray 13 and a discharge tray 14. The front cover 11 is coupled to a cassette 15 on which the medium is placed, and has a configuration in which the medium can be set in the cassette 15 by opening the front cover 11 and pulling out the cassette 15. That is, the recording device 10 has a configuration in which recording can be performed on the medium set in the feeding tray 13, and a configuration in which recording can be performed on the medium set in the cassette 15.

When recording is performed on the medium set in the feeding tray 13, the recording device 10 rotates a feeding roller 81 once in a rotational direction C1 to feed the medium to a transport roller 83, subsequently rotates the transport roller 83 in a rotational direction C2, thereby transporting the medium to a facing position P1 facing the recording head 71, and rotates the transport roller 83 in the rotation direction C2 and rotates a roller 84 and a discharge roller 85 to discharge the medium after recording to the discharge tray 14. A transport path of the medium by the feeding roller 81 constitutes a transport path R1, and a transport path of the medium by the transport roller 83 and the like constitutes a transport path R4. Note that a separation roller 82 is provided at a position facing the feeding roller 81 in the transport path R1, and thus, when a plurality of media are set in the feeding tray 13, the feeding of multiple media is suppressed.

Here, a roller pair 88 including an auxiliary roller 86 rotatable in the rotational direction C1 and a driven roller 87 provided at a position facing the auxiliary roller 86 is provided between the feeding roller 81 and the transport roller 83 in the transport path R1. The recording device 10 assists in the transport of the medium by rotating the auxiliary roller 86 in the rotational direction C1 when the medium is in a sandwiched position between the roller pair 88 in the transport path R1. Therefore, the recording device 10 can suppress transport failure of the medium in the transport path R1.

When recording is performed on the medium set in the cassette 15, the recording device 10 rotates a pick unit rotational shaft 91 to rotate a pickup roller 92 of a pick unit 90 in the rotational direction C2, and transports the medium through a transport path R2 serving as the feeding path, thereby feeding the medium to the transport roller 83. Then, the recording device 10 rotates the transport roller 83 in the rotational direction C2, thereby transporting the medium to the facing position P1 facing the recording head 71, and rotates the transport roller 83 in the rotational direction C2 and rotates the roller 84 and the discharge roller 85 to discharge the medium after recording to the discharge tray 14.

After performing recording on a surface of a first side of the medium, the recording device 10 transports the medium to a transport path R3, which is an inversion path, before discharging the medium to the discharge tray 14, and performs recording on the other side of the medium. Note that the transport path R3 partially overlaps the transport path R2, and an inversion roller 93 and a plurality of driven rollers 94 provided at positions facing the inversion roller 93 are formed in this overlapped transport path.

The recording head 71 is provided to a carriage 72 movable in the X direction. The recording device 10 is capable of ejecting the liquid from the recording head 71 onto the transported medium while causing the carriage 72 to reciprocate in the X direction. With the carriage 72 having such a configuration being included, the recording device 10 forms a desired image on the medium by repeating the transport of the medium by a predetermined transport amount, and the ejection of the liquid while moving the carriage 72 in the X direction while the medium M is stopped.

Note that while, in this exemplary embodiment, the recording device 10 including the scanner unit 35 in the recording mechanism unit cover 30 is illustrated as an example, the recording device may have a configuration that does not include the scanner unit. Further, the recording device may have a configuration including a finisher such as a staple finisher instead of the scanner unit.

Further, while in this exemplary embodiment a so-called serial printer configured to perform recording by alternately repeating the transport of the medium by a predetermined amount and the reciprocation of the carriage 72 is illustrated as an example of the recording device 10, the recording device is not limited thereto. The recording device may also be a so-called line printer configured to use a line head including nozzles linearly formed in the X direction to continuously perform recording while continuously transporting the medium.

1-2. Configuration of Ribs and Protruding Portions

As illustrated in FIG. 2, the second side surface 20b and the third side surface 20c of the housing 20 include the notch portion 23. In a side view from the X direction, the notch portion 23 forms a long rectangle in the Y direction, and is cut downward from respective upper ends of the front sides of the second side surface 20b and the third side surface 20c.

As illustrated in FIG. 4, the second side surface 40b and the third side surface 40c of the main body portion 40 each include the protruding portion 44. In a side view from the X direction, the protruding portion 44 forms a long rectangle in the Y direction, protrudes from the second side surface 40b to the positive side in the X direction, and protrudes from the third side surface 40c to the negative side in the X direction. The protruding portion 44 is exposed from the notch portion 23 of the housing 20 in the closed state of the recording mechanism unit cover 30. In other words, the protruding portion 44 is provided in a position overlapping the notch portion 23 in a side view from the X direction.

The second side surface 40b and the third side surface 40c of the main body portion 40 each include the recessed portion 45 recessed in a concave shape. The recessed portion 45 is provided on a lower side of the protruding portion 44, that is, on the negative side in the Z direction. In this exemplary embodiment, the recessed portion 45 recessed in a rectangular shape is provided on the inside of the protruding portion 44 protruding in a rectangular shape. In other words, in a side view from the X direction, the recessed portion 45 overlaps the protruding portion 44 and a portion of the protruding portion 44 protrudes above the recessed portion 45. Note that while, in this exemplary embodiment, a configuration in which the recessed portion 45 and the protruding portion 44 overlap is illustrated as an example, the protruding portion 44 and the recessed portion 45 may be independently provided in the up-down direction. The notch portions 23, the protruding portions 44, and the recessed portions 45 are disposed symmetrically with respect to an imaginary line CL parallel with the first side surface 20a of the housing 20 and orthogonal to the first side surface 40a of the main body portion 40. Note that the protruding portions 44, the recessed portions 45, and the notch portions 23 may be disposed at a center in the Y direction, ribs 50 may be provided on both sides of the notch portions 23 and the protruding portions 44 in the Y direction, and the notch portions 23 and the protruding portions 44 may be provided between the ribs 50 in the Y direction.

Figure 7:
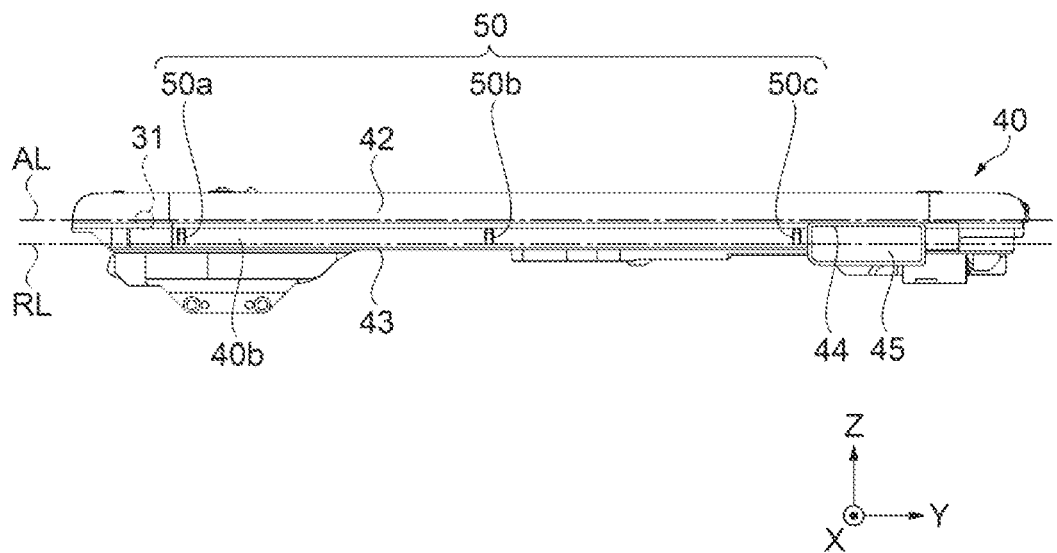
FIG. 7 is a side view illustrating a configuration of the recording mechanism unit cover.

As illustrated in FIG. 2 and FIG. 7, the ribs 50 configured to support the second side surface 20b or the third side surface 20c of the housing 20 with the recording mechanism unit cover 30 in the closed state are provided to the second side surface 40b and the third side surface 40c of the main body portion 40 constituting the recording mechanism unit cover 30. Specifically, the configuration is such that, with the recording mechanism unit cover 30 in the closed state, a portion of a lower side of the main body portion 40 enters inside the housing 20 and is surrounded by the inner surfaces 21, and therefore a member supporting the upper portions of the second side surface 20b and the third side surface 20c is not provided in the housing 20. Therefore, a rigidity of the second side surface 20b and the third side surface 20c is lower than a rigidity of the first side surface 20a and the fourth side surface 20d and, when the recording mechanism unit cover 30 is brought into the open state, the upper portions of the second and third side surfaces 20b, 20c may deform inwardly in the housing 20. Thus, the recording device 10 according to this exemplary embodiment includes, on the second side surface 40b and the third side surface 40c of the main body portion 40, the ribs 50 configured to correct deformation when the recording mechanism unit cover 30 is brought into the closed state by coming into contact with and supporting the inwardly deformed second and third side surfaces 20b, 20c.

Figure 8:
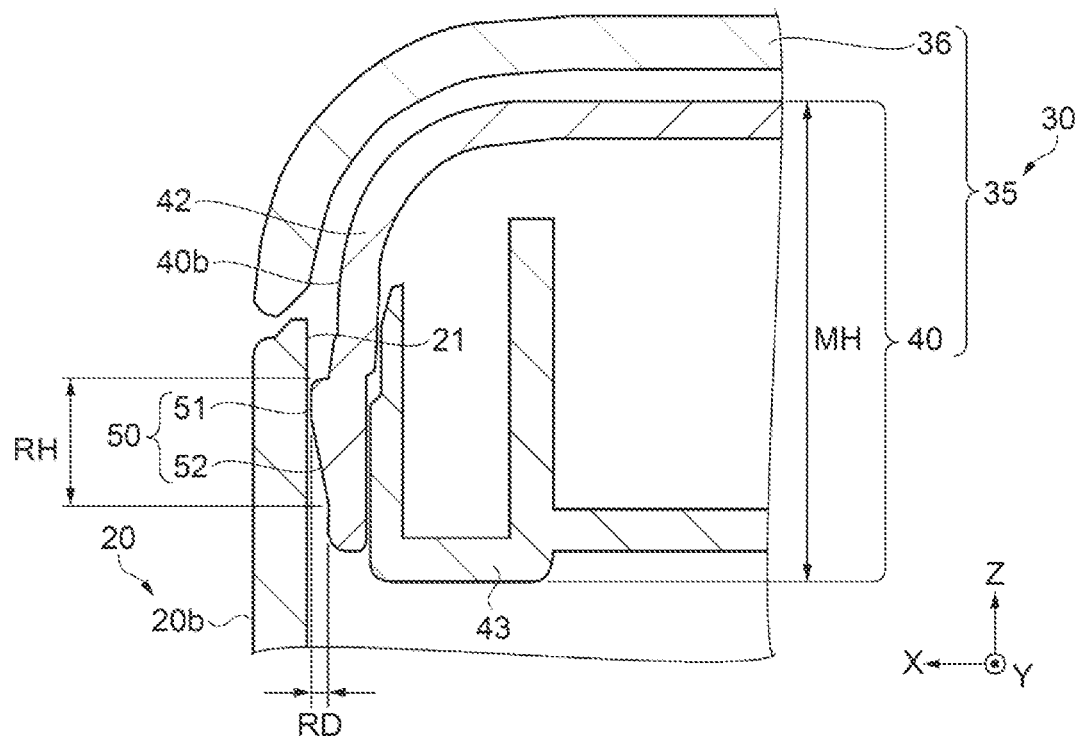
FIG. 8 is a cross-sectional view of a rib taken along line A-A in FIG. 1.

As illustrated in FIG. 8, the main body portion 40 is configured with the upper case 42 having a box shape with an open lower surface covering the lower case 43 having a box shape with an open upper surface. With the main body portion 40 thus configured, high strength can be obtained. The upper case 42 forms an upper surface of the main body portion 40 and the first to fourth side surfaces 40a, 40b, 40c, 40d of the main body portion 40. That is, the ribs 50 are provided to the upper case 42 on the second side surface 40b and the third side surface 40c of the main body portion 40. The rib 50 configured to support the second side surface 20b of the housing 20 and the rib 50 configured to support the third side surface 20c of the housing 20 are disposed symmetrically with respect to the imaginary line CL orthogonal to the first side surface 20a of the housing 20. Accordingly, the rib 50 provided to the second side surface 40b of the main body portion 40 will be described below, and description of the rib 50 provided to the third side surface 40c will be omitted.

As illustrated in FIG. 7 and FIG. 8, in a cross-sectional side view from the Y direction, the rib 50 protrudes from the second side surface 40b of the main body portion 40 and, in a side view from the X direction, has a long rectangular shape in the vertical direction. The rib 50 includes a flat surface 51 having a constant protruding dimension RD from the second side surface 40b of the main body portion 40, and an inclined surface 52 from a lower end portion of the flat surface 51 toward the negative side in the Z direction. The inclined surface 52 is continuous with the lower end portion of the flat surface 51, and the protruding dimension RD from the second side surface 40b gradually decreases toward the negative side in the Z direction, separating from the flat surface 51. In other words, in a side view of the first side surface 20a of the housing 20, when the recording mechanism unit cover 30 is in the closed state, the flat surface 51 is a surface parallel with the second side surface 20b of the housing 20. The inclined surface 52 is a surface in which a distance from the second side surface 20b supported by the rib 50, that is, the second side surface 20b of the housing 20, gradually increases toward the negative side in the Z direction.

In a side view from the X direction, a thickness direction, that is, a height RH in the Z direction orthogonal to the scanner bed 41, of the main body portion 40 of the rib 50 overlaps a height MH of the main body portion 40. Further, in a side view from the X direction, the rib 50 with the recording mechanism unit cover 30 in the closed state is covered by the second side surface 20b of the housing 20.

Figure 9:
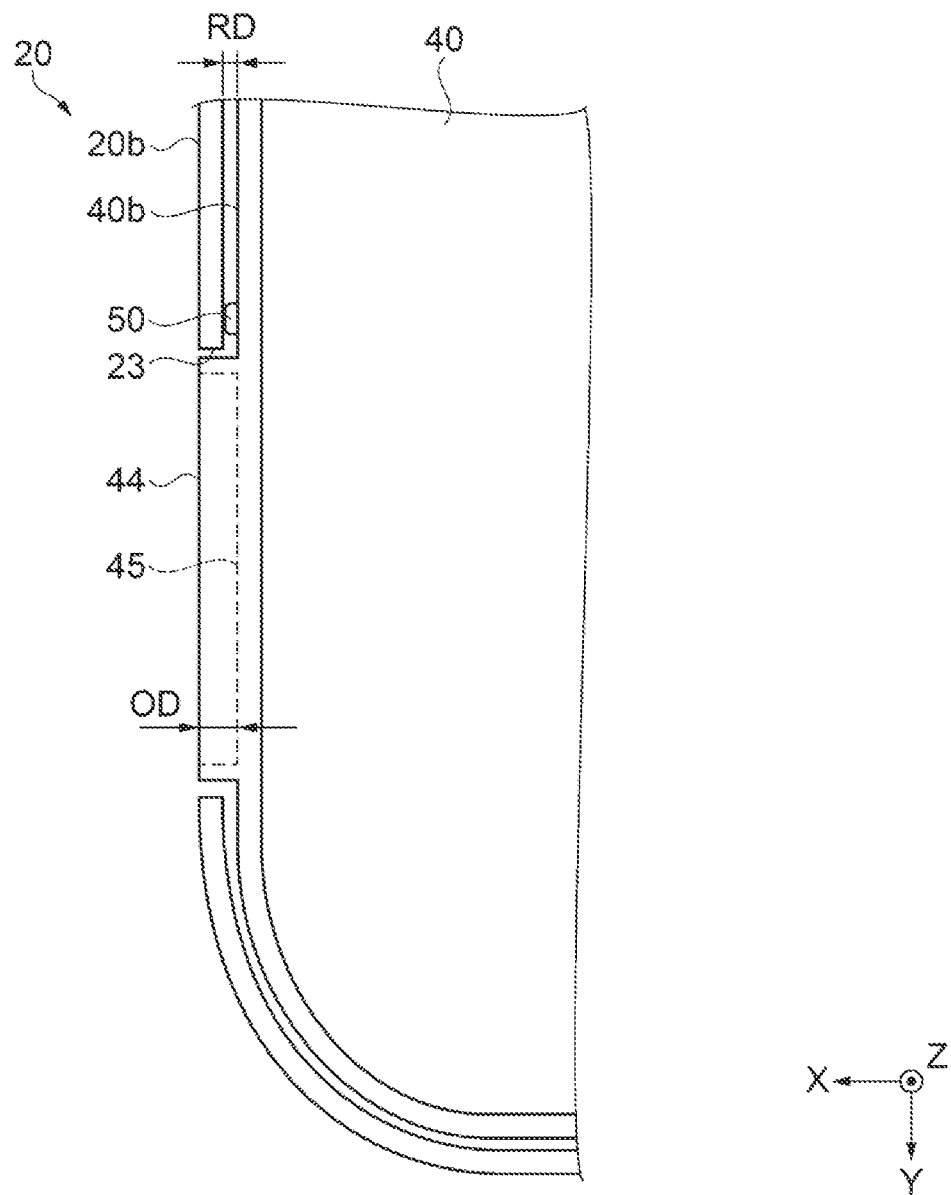
FIG. 9 is an enlarged plan view schematically illustrating main portions of the main body portion in a closed state.
Figure 10:
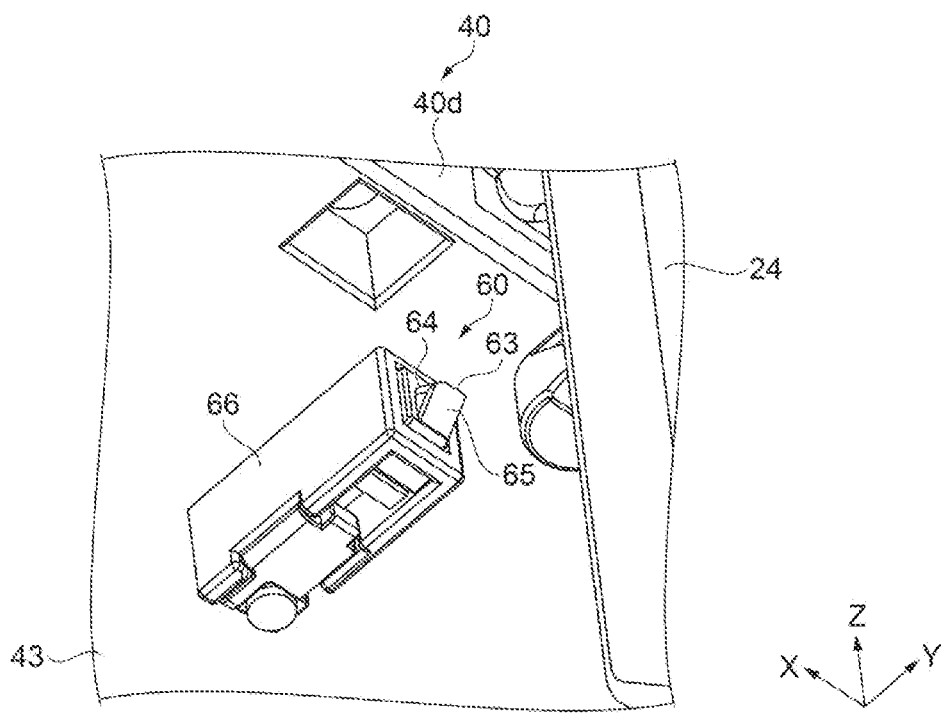
FIG. 10 is a perspective view illustrating a configuration of an engaging portion.
Figure 11:
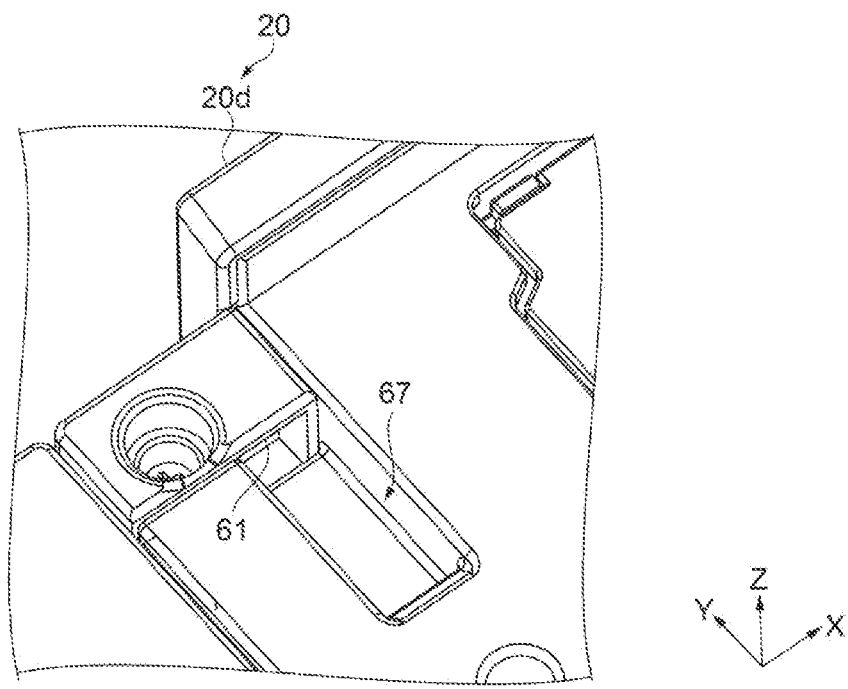
FIG. 11 is a perspective view illustrating a configuration of an engaged portion.
Figure 12:
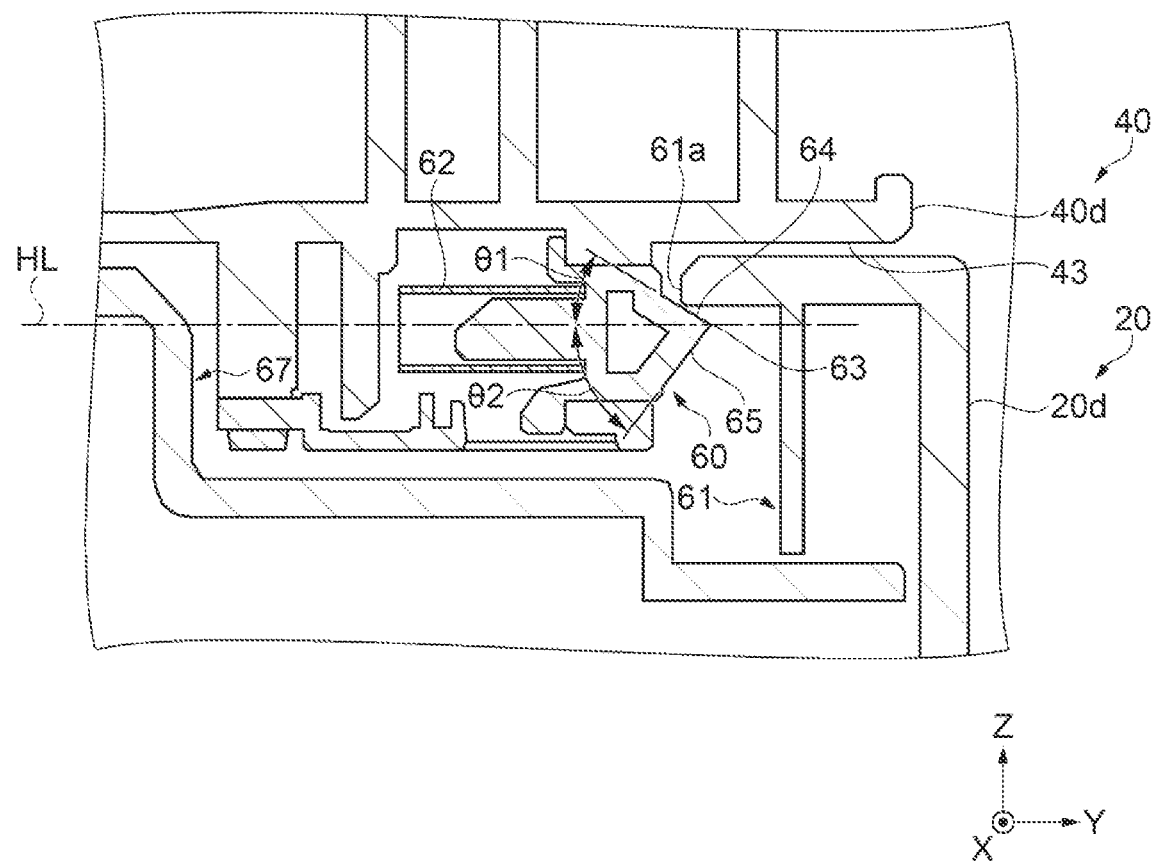
FIG. 12 is a cross-sectional view illustrating a state in which the engaging portion is engaged with the engaged portion.

As illustrated in FIG. 9, the protruding dimension RD of the rib 50 protruding from the second side surface 40b of the body portion 40 is less than a protruding dimension OD of the protruding portion 44 protruding from the second side surface 40b of the body portion 40. The protruding dimension RD of the rib 50 is preferably less than the protruding dimension OD by a dimension corresponding to a thickness of the second side surface 20b of the housing 20. Thus, with the recording mechanism unit cover 30 in the closed state, the second side surface 20b and the protruding portion 44 can constitute the same plane.

As illustrated in FIG. 2 and FIG. 7, the rib 50 is provided between the rotational shaft 31 and the protruding portion 44. The recording device 10 according to this exemplary embodiment includes three ribs 50 of a first rib 50a, a second rib 50b, and a third rib 50c, from the rotational shaft 31 toward the protruding portion 44. That is, with the recording mechanism unit cover 30 in the closed state, the second side surface 20b and the third side surface 20c of the housing 20 are supported by a plurality of the ribs 50. The first to third ribs 50a, 50b, 50c are positioned on the negative side in the Z direction of an axis line AL passing through an axial core of the rotational shaft 31 and parallel with an imaginary line RL.

The imaginary line RL is a line connecting lower ends of the first to third ribs 50a, 50b, 50c in the closed state. The imaginary line RL is also a straight line parallel with a placement surface of the recording device 10 and a straight line parallel with a boundary (seam) between the second side surface 20b and the recording mechanism unit cover 30 in the closed state, that is, a straight line parallel with the Y-axis. With such a configuration, when the recording mechanism unit cover 30 changes in position from the open state to the closed state, the second side surface 20b of the housing 20 can be sequentially supported by the first rib 50a close to the rotational shaft 31 and then the second rib 50b and the third rib 50c. At this time, the ribs 50 and the second side surface 20b slide, possibly causing scratches on the second side surface 20b. The ribs 50 of this exemplary embodiment are provided on the recording mechanism unit cover 30 side and scratches occur on the inner surface 21 of the second side surface 20b, and thus the scratches caused by sliding between the ribs 50 and the second side surface 20b are hard to visually recognize.

As illustrated in FIG. 2 and FIG. 10 to FIG. 12, the main body portion 40 of the recording mechanism unit cover 30 includes an engaging portion 60 engageable with the housing 20. Further, the housing 20 includes an engaged portion 61 engaged with the engaging portion 60 with the recording mechanism unit cover 30 in the closed state. The engaging portion 60 is provided to a lower surface of the lower case 43 constituting the main body portion 40, on the negative side in the Z direction. The engaged portion 61 is provided to an upper surface of the fourth side surface 20d of the housing 20, extending from an upper end portion to the negative side in the Y direction.

The engaging portion 60 includes a vertex 63 protruding from an engaging portion case 66 having a rectangular parallelepiped shape in a direction parallel with the installation surface of the recording device 10, that is, along the X-Y plane, an upper inclined surface 64 inclined downward toward the apex 63, and a lower inclined surface 65 inclined upward toward the apex 63. The engaging portion 60 has a convex shape with the upper inclined surface 64, the apex 63, and the lower inclined surface 65. The engaging portion case 66 of this exemplary embodiment has a long rectangular parallelepiped shape in the Y direction, and the engaging part 60 protrudes from a front face of the engaging portion case 66 toward the positive side in the Y direction.

An upper surface inner angle θ1 formed by an imaginary line HL extending in a horizontal direction through the apex 63 and the upper inclined surface 64 is configured to be more acute than a lower surface inner angle θ2 formed by the imaginary line HL and the lower inclined surface 65. The imaginary line HL extending in the horizontal direction is a straight line parallel with the installation surface of the recording device 10. A biasing member 62 configured to bias the engaging portion 60 to the positive side in the Y direction is provided in an interior of the engaging portion case 66. An elastic member such as a coil spring is used as the biasing member 62.

A pit 67 in which the engaging portion case 66 having the rectangular parallelepiped shape can be embedded with the recording mechanism cover 30 in the closed state is provided in the upper surface of the housing 20. The engaged portion 61 forms a concave shape recessed from an inner surface of the pit 67 toward the positive side in the Y direction.

When the recording mechanism unit cover 30 is rotated from the open state to the closed state, an upper end portion 61a of the engaged portion 61 and the lower inclined surface 65 of the engaging portion 60 slide, causing the engaging portion 60 to retract to the negative side in the Y direction and subsequently protrude inside the engaged portion 61 having the concave shape, thereby engaging the engaging portion 60 and the engaged portion 61.

When the recording mechanism unit cover 30 is rotated from the closed state to the open state, the upper end portion 61a of the engaged portion 61 and the upper inclined surface 64 of the engaging portion 60 slide, causing the engaging portion 60 to retract to the negative side in the Y direction, thereby disengaging the engaging portion 60 and the engaged portion 61.

Figure 13:
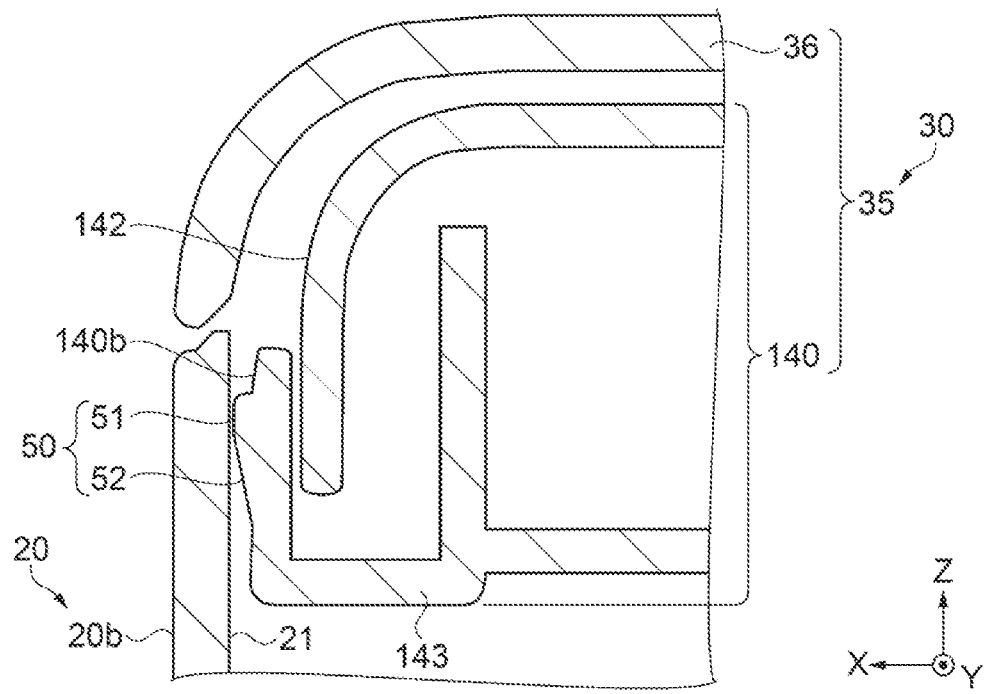
FIG. 13 is a cross-sectional view illustrating the configuration of the recording mechanism unit cover.

Note that while, in this exemplary embodiment, the main body portion 40 having a configuration in which the lower case 43 having a rectangular parallelepiped shape with an open upper surface is covered by the upper case 42 having a rectangular parallelepiped shape with an open lower surface is illustrated as an example, the main body portion may be a main body portion 140 having a configuration in which an upper case 142 having a rectangular parallelepiped shape with an open lower surface is covered by a lower case 143 having a rectangular parallelepiped shape with an open upper surface, as illustrated in FIG. 13. In this case, the ribs 50 are provided to the lower case 143 on a second side surface 140b and a third side surface 140c of the main body portion 140. The protruding portion 44 and recessed portion 45 are provided to the lower case 143. Furthermore, the protruding portion 44 and the recessed portion 45 may be provided across both the upper case 142 and the lower case 143.

Further, while in this exemplary embodiment a configuration in which three ribs 50 are provided between the rotational shaft 31 and the protruding portion 44 is illustrated as an example, the number of ribs 50 may be one or four or more.

Further, while in this exemplary embodiment a combination of the engaging portion 60 forming a convex shape and the engaged portion 61 forming a concave shape is illustrated as an example, the combination may be that of an engaging portion forming a concave shape and an engaged portion forming a convex shape. Further, while in this exemplary embodiment the engaging portion 60 protruding toward the positive side in the Y direction is illustrated as an example, the direction of the engaging portion is not particularly limited as long as the protruding direction of the engaging portion is along the X-Y plane. In this case, the engaged portion is configured in an orientation engageable with the engaging portion.

As described above, according to the recording device 10 according to this exemplary embodiment, the effects below can be achieved.

The recording device 10 includes the recording mechanism unit cover 30 that enters inside the housing 20. The main body portion 40 constituting the recording mechanism unit cover 30 includes, on the second side surface 40b and the third side surface 40c thereof, the ribs 50 configured to support the second side surface 20b and the third side surface 20c of the housing 20. Even in a case in which the second side surface 20b and the third side surface 20c of the housing 20 inwardly deform in the housing 20, by the recording mechanism unit cover 30 being brought into the closed state, the ribs 50 outwardly support the second side surface 20b and the third side surface 20c of the housing 20, making it possible to correct the deformation of the housing 20. Further, with the recording mechanism unit cover 30 in the closed state, the second side surface 20b of the housing 20 and the second side surface 40b of the recording mechanism unit cover 30 readily constitute the same plane, and the third side surface 20c of the housing 20 and the third side surface 40c of the recording mechanism unit cover 30 readily constitute the same plane. This improves the aesthetic appearance of the device.

The ribs 50 are provided at positions overlapping the main body portion 40 in the Z direction, making it possible to reduce the size of the recording device 10 in the height direction compared to a configuration in which the ribs 50 are provided below the main body portion 40 and do not overlap in the Z direction.

The protruding dimension OD of the protruding portion 44 protruding from the notch portion 23 and protruding from the second side surface 40b and the third side surface 40c of the main body portion 40 is greater than the protruding dimension RD of the ribs 50. With this configuration, the user can easily hook his or her finger onto the protruding portion 44 and easily rotate the recording mechanism unit cover 30. Further, with the recording mechanism unit cover 30 in the closed state, the second side surface 20b and the protruding portion 44 readily constitute the same plane.

The main body portion 40 includes the recessed portion 45 recessed in a concave shape below the protruding portion 44, and thus the user can easily hook his or her finger onto the protruding portion 44 and easily rotate the recording mechanism unit cover 30.

The protruding portion 44 is provided at a position farther from the rotational shaft 31 than the ribs 50, and thus the user can easily rotate the recording mechanism unit cover 30 from the closed state to the open state.

With the recording mechanism unit cover 30 in the closed state, the ribs 50 are covered by the second side surface 20b and the third side surface 20c of the housing 20. Accordingly, the ribs 50 are not visible to the user, and thus the aesthetic appearance of the device is improved.

The second side surface 20b and the third side surface 20c of the housing 20 are each integrally formed. The second side surface 20b and the third side surface 20c, each formed by one seamless surface, are supported by the plurality of ribs 50, thereby improving the aesthetic appearance of the device.

When the recording mechanism unit cover 30 is changed in position from the open state to the closed state, the second side surface 20b and the third side surface 20c of the housing 20 are sequentially supported from the rib 50 close to the rotational shaft 31. Thus, for example, compared to a configuration in which the plurality of ribs 50 simultaneously begin to come into contact with the second side surface 20b and the third side surface 20c of the housing 20, a rotational load when the recording mechanism unit cover 30 is brought into the closed state is dispersed, and the recording mechanism unit cover 30 can be easily closed.

The rib 50 configured to support the second side surface 20b of the housing 20 and the rib 50 configured to support the third side surface 20c of the housing 20 are disposed symmetrically, and thus a twisting of the rotational shaft 31 when the recording mechanism unit cover 30 is closed is suppressed.

The second side surface 40b and the third side surface 40c of the main body portion 40 constituting the recording mechanism unit cover 30 are coupled to at least one of the first side surface 40a and the fourth side surface 40d, and thus the rigidity of the recording mechanism unit cover 30 is improved.

The second side surface 20b and the third side surface 20c of the housing 20 each include the curved surface 22 and are coupled to the first side surface 20a and the fourth side surface 20d via the curved surface 22. With the second side surface 20b and the third side surface 20c each including the curved surface 22, the rigidity of the second side surface 20b and the third side surface 20c is improved. Furthermore, the first side surface 20a and the fourth side surface 20d are coupled via the curved surface 22, thereby improving the rigidity of the housing 20.

The rib 50 includes the flat surface 51, making it possible to suitably support the second side surface 20b and the third side surface 20c of housing 20. Further, the rib 50 includes the inclined surface 52 extending downward from the lower end portion of the flat surface 51. The recording mechanism unit cover 30 is in the closed state while the inclined surface 52 of each of the ribs 50 and the second side surface 20b and the third side surface 20c of the housing 20 slide, and thus the recording mechanism unit cover 30 can be suitably brought into the closed state.

The recording mechanism unit cover 30 includes the engaging portion 60 that engages with the engaged portion 61 provided to the housing 20 in the closed state, and thus it is possible to suppress rotation of the recording mechanism unit cover 30 with respect to the housing 20 when the operation unit 24 is tilted with respect to the recording mechanism unit cover 30.

The engaging portion 60 having a convex shape includes the apex 63, the upper inclined surface 64, and the lower inclined surface 65. The lower inclined surface 65 is a surface that slides with the engaged portion 61 when the recording mechanism unit cover 30 is in the closed state. The upper inclining surface 64 is a surface that slides with the engaged portion 61 when the recording mechanism unit cover 30 is in the open state. The upper surface inner angle $\theta1$ formed by the imaginary line HL extending in the horizontal direction and the upper inclined surface 64 is more acute than the lower surface inner angle $\theta2$ formed by the imaginary line HL and the lower inclined surface 65, and thus the load can be reduced when the recording mechanism unit cover 30 is brought into the closed state. Conversely, the load can be increased when the recording mechanism unit cover 30 is brought into the open state, and thus rotation of the recording mechanism unit cover 30 with respect to the housing 20 when the operation unit 24 is tilted with respect to the recording mechanism unit cover 30 can be suppressed.

2. Second Exemplary Embodiment

Constituent elements that are the same as the constituent elements in the first exemplary embodiment are denoted by the same reference signs, and duplicate descriptions thereof will be omitted.

Figure 14:
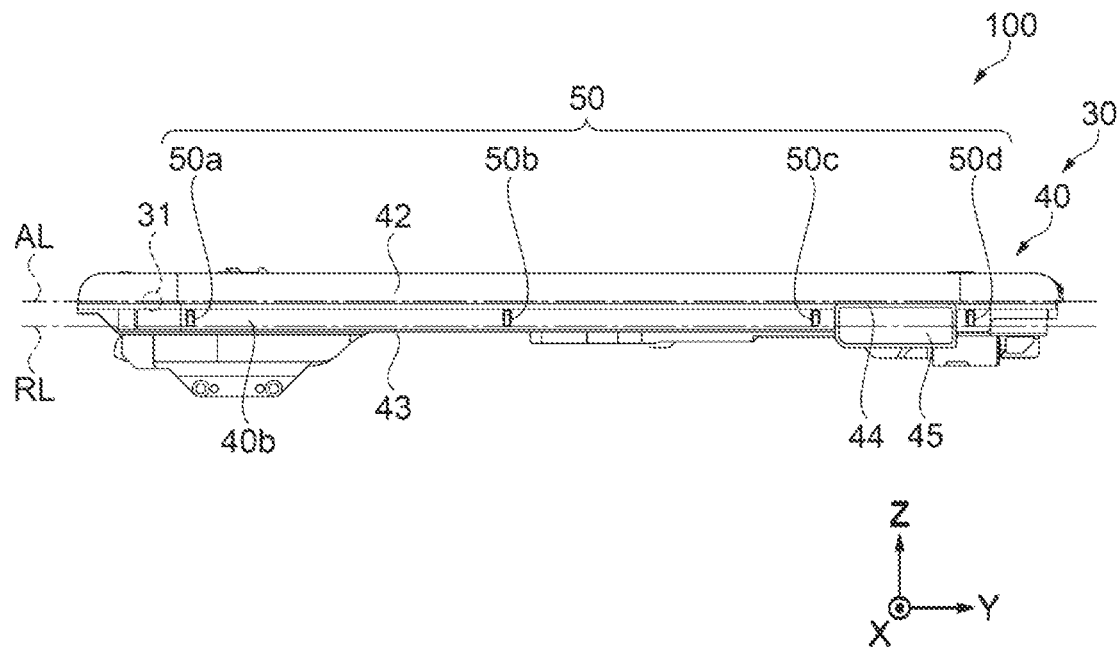
FIG. 14 is a side view illustrating a configuration of a recording mechanism unit cover of a recording device according to a second exemplary embodiment.

A recording device 100 includes the recording mechanism unit cover 30. The ribs 50 are provided to the second side surface 40b and the third side surface 40c of the main body portion 40 constituting the recording mechanism unit cover 30. As illustrated in FIG. 14, the ribs 50 are provided between the rotational shaft 31 and the protruding portion 44. The protruding portion 44 is further provided between the ribs 50. The recording device 100 according to this exemplary embodiment includes the three ribs 50 of the first rib 50a, the second rib 50b, and the third rib 50c, from the rotational shaft 31 toward the protruding portion 44, and further includes a fourth rib 50d on the positive side of the protruding portion 44 in the Y direction.

The recording device 100 includes the third rib 50c and the fourth rib 50d on both sides of the protruding portion 44, and thus the second side surface 20b and the third side surface 20c of the housing 20 are suitably supported.

3. Third Exemplary Embodiment

Constituent elements that are the same as the constituent elements in the first exemplary embodiment are denoted by the same reference signs, and duplicate descriptions thereof will be omitted.

Figure 15:
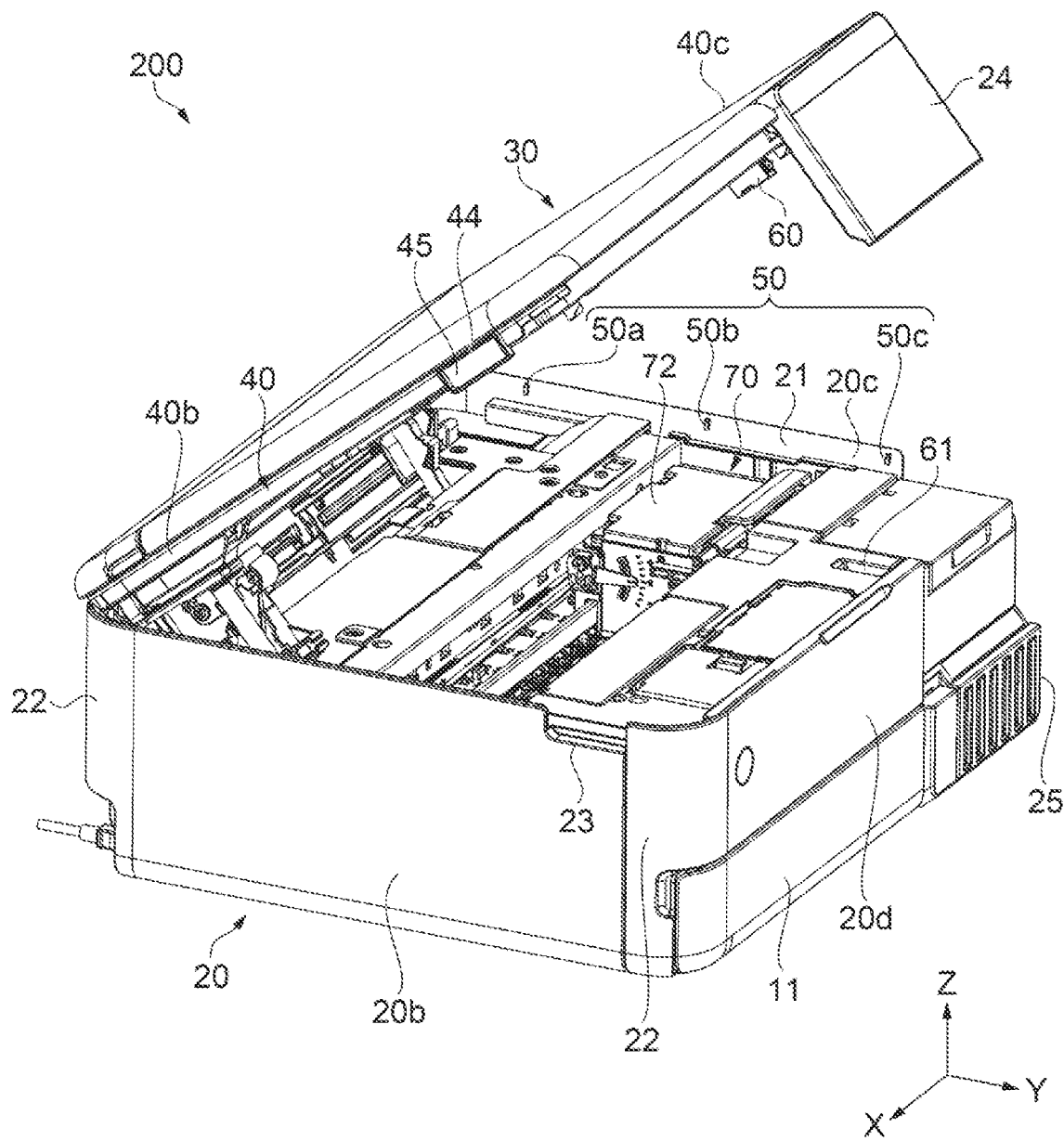
FIG. 15 is a perspective view illustrating a configuration of a recording device according to a third exemplary embodiment.

As illustrated in FIG. 15, a recording device 200 includes the housing 20 including the recording mechanism unit 70 configured to perform recording on the medium, and the recording mechanism unit cover 30 configured to rotate the upper surface of the housing 20 to the open state and the closed state. Further, the second side surface 20b and the third side surface 20c of the housing 20 each include the notch portion 23, and the recording mechanism unit cover 30 includes the protruding portion 44 exposed from the notch portion 23 and the recessed portion 45. The recording mechanism unit cover 30 is configured to enter the inner surfaces 21 of the first to fourth side surfaces 20a to 20d of the housing 20 in the closed state. Similar to the first exemplary embodiment, the recording mechanism unit cover 30 may be configured to include the scanner bed 41, the scanner bed cover 36, and the scanner unit 35.

The rib 50 configured to support the second side surface 20b or the third side surface 20c of the housing 20 in the closed state is provided to at least one of the second side surface 40b and the third side surface 40c of the main body portion 40 constituting the recording mechanism unit cover 30, and the second side surface 20b and the third side surface 20c of the housing 20.

The recording device 200 according to this exemplary embodiment illustrates an example of a configuration including the ribs 50 on the second side surface 20b and the third side surface 20c of the housing 20. The ribs 50 include the three ribs of the first rib 50a, the second rib 50b, and the third rib 50c from the rear end in the Y direction toward the notch portion 23, at the upper end portions of the inner surfaces 21 of the second side surface 20b and the third side surface 20c. In a side view from the X direction, the height RH of the ribs 50 provided to the second side surface 20b and the third side surface 20c of the housing 20 with the recording mechanism unit cover 30 in the closed state overlaps the height MH of the main body portion 40. The rib 50 includes the flat surface 51 and the inclined surface 52 extending from the upper end portion of the flat surface 51 toward the positive side in the Z direction. The inclined surface 52 is a surface that is continuous with the upper end portion of the flat surface 51 and gradually increases in distance from the second side surface 40b supported by the ribs 50, that is, the second side surface 40b of the recording mechanism unit cover 30, toward the positive side in the Z direction, separating from the flat surface 51.

Note that while, in this exemplary embodiment, a configuration in which the ribs 50 are provided to the second side surface 20b and the third side surface 20c of the housing 20 is illustrated as an example, the configuration may be one in which the ribs 50 are provided to both the second side surface 20b of the housing 20 and the second side surface 40b of the main body portion 40, and to both the third side surface 20c of the housing 20 and the third side surface 40c of the main body portion 40. Further, the protruding portions 44, the recessed portions 45, and the notch portions 23 may be disposed at the center in the Y direction, the ribs 50 may be provided on both sides of the notch portions 23 and the protruding portions 44 in the Y direction, and the notch portions 23 and the protruding portions 44 may be provided between the ribs 50 in the Y direction.

The recording device 200 includes the ribs 50 configured to support the second side surface 20b and the third side surface 20c of the housing 20 on at least one of the second side surface 40b and the third side surface 40c of the main body portion 40 constituting the recording mechanism unit cover 30 that enters the inner surfaces 21 of the housing 20, and the second side surface 20b and the third side surface 20c of the housing 20. Even in a case in which the second side surface 20b and the third side surface 20c of the housing 20 inwardly deform in the housing 20, the ribs 50 outwardly support the second side surface 20b and the third side surface 20c of the housing 20 by the recording mechanism unit cover 30 being brought into the closed state, making it possible to correct the deformation of the housing 20.

Further, the main body portion 40 includes the recessed portion 45 recessed in a concave shape below the protruding portion 44, and thus the user can easily hook his or her finger onto the protruding portion 44 and easily rotate the recording mechanism unit cover 30.

The ribs 50 are provided at positions overlapping the main body portion 40, making it possible to reduce the size of the recording device 200 in the height direction compared to a configuration in which the ribs 50 are provided below the main body portion 40.

What is claimed is:

1. A recording device, comprising:
   a housing including a recording mechanism unit configured to perform recording on a target recording medium; and
   a recording mechanism unit cover configured to rotate, by a rotational shaft along a first side surface of the housing, between an open state of an upper surface of the housing being open and a closed state of the upper surface of the housing being closed, wherein
   a part of the recording mechanism unit cover is configured to be inside the housing in the closed state,
   a second side surface and a third side surface of the recording mechanism unit cover that intersect the first side surface of the housing in the closed state are provided with a plurality of ribs configured to support a second side surface and a third side surface of the housing that intersects the first side surface of the housing, and
   when the recording mechanism unit cover is changed in position from the open state to the closed state, the second side surface and the third side surface of the housing are supported in sequence from a rib, of the plurality of ribs, near the rotational shaft.

2. The recording device according to claim 1, wherein the recording mechanism unit cover includes a scanner unit including a main body portion provided with a scanner bed for placement of an original document and a scanner bed cover for opening and closing the scanner bed, and configured to scan the original document,
   the rib is provided to a second side surface and a third side surface of the main body portion, and
   a height of the rib in a thickness direction of the main body portion overlaps a height of the main body portion.

3. The recording device according to claim 2, wherein the housing includes a notch portion at the second side surface and the third side surface of the housing that intersect the first side surface of the housing, the main body portion includes a protruding portion exposed from the notch portion and protruding from the second side surface and the third side surface of the main body portion, and a protruding dimension of the rib protruding from the second side surface and the third side surface of the main body portion is smaller than a protruding dimension of the protruding portion.

4. The recording device according to claim 3, wherein the main body portion includes a recessed portion recessed in a concave shape on a lower side of the protruding portion.

5. The recording device according to claim 4, wherein the rib, in a side view from the first side surface of the housing, includes a flat surface parallel with the second side surface and the third side surface of the housing and an inclined surface continuous with an upper end portion or a lower end portion of the flat surface and having a distance from a surface supported by the rib that gradually increases as the distance from the flat surface increases.

6. The recording device according to claim 3, wherein the rib is provided between the rotational shaft and the protruding portion.

7. The recording device according to claim 6, wherein the protruding portion is further provided between the plurality of ribs.

8. The recording device according to claim 1, wherein the rib is covered by the second side surface and the third side surface of the housing in the closed state.

9. The recording device according to claim 1, wherein the second side surface and the third side surface of the housing are each integrally formed, and the second side surface and the third side surface of the housing are each supported by the plurality of ribs in the closed state.

10. The recording device according to claim 1, wherein the rib configured to support the second side surface of the housing and the rib configured to support the third side surface of the housing are disposed symmetrically with respect to an imaginary line orthogonal to the first side surface of the housing.

11. The recording device according to claim 1, wherein the second side surface and the third side surface of the recording mechanism unit cover are coupled to at least one of a first side surface and a fourth side surface of the recording mechanism unit cover that intersect the second side surface and the third side surface.

12. The recording device according to claim 1, wherein the second side surface and the third side surface of the housing include a curved surface that curves toward at least one of the first side surface and a fourth side surface of the housing that intersect the second side surface and the third side surface of the housing, and are coupled to the first side surface and the fourth side surface of the housing.

13. The recording device according to claim 1, wherein the rib, in a side view from the first side surface of the housing, includes:

a flat surface parallel with the second side surface and the third side surface of the housing; and an inclined surface continuous with an upper end portion or a lower end portion of the flat surface and having a distance from a surface supported by the rib that gradually increases as the distance from the flat surface increases.

14. The recording device according to claim 1, wherein the recording mechanism unit cover includes an operation unit rotatably coupled to the recording mechanism unit cover and an engaging portion engageable with the housing, the housing includes an engaged portion engaged with the engaging portion in the closed state, one of the engaging portion and the engaged portion has a convex shape and the other has a concave shape, and a biasing member configured to bias one of the engaging portion and the engaged portion to the other is provided to the housing.

15. The recording device according to claim 14, wherein the convex shape includes an apex protruding in a direction parallel with an installation surface of the recording device in the closed state, an upper inclined surface inclined toward the apex, and a lower inclined surface inclined toward the apex, and an upper surface inner angle formed by the parallel direction and the upper inclined surface is more acute than a lower surface inner angle formed by the parallel direction and the lower inclined surface.

16. The recording device according to claim 1, wherein another part of the recording mechanism unit cover is configured to be outside the housing in the closed state.

17. A recording device, comprising:

a housing including a recording mechanism unit configured to perform recording on a target recording medium; and a recording mechanism unit cover configured to rotate, by a rotational shaft along a first side surface of the housing, between an open state of an upper surface of the housing being open and a closed state of the upper surface of the housing being closed, wherein a part of the recording mechanism unit cover is configured to be inside the housing in the closed state, at least one of a second side surface and a third side surface of the recording mechanism unit cover that intersect the first side surface of the housing in the closed state, and the second side surface and the third side surface of the housing that intersect the first side surface of the housing is provided with a plurality of ribs configured to support the second side surface and the third side surface of the housing or the recording mechanism unit cover, when the recording mechanism unit cover is changed in position from the open state to the closed state, the second side surface and the third side surface of the housing are supported in sequence from a rib, of the plurality of ribs, near the rotational shaft, the housing includes a notch portion in the second side surface and the third side surface of the housing that intersect the first side surface of the housing, and the recording mechanism unit cover includes:

a protruding portion exposed from the notch portion and protruding from the second side surface and the third side surface of the recording mechanism unit cover; and a recessed portion recessed in a concave shape on a lower side of the protruding portion.

18. The recording device according to claim 17, wherein the recording mechanism unit cover includes a scanner unit including a main body portion provided with a scanner bed for placement of an original document and a scanner bed cover for opening and closing the scanner bed, and configured to scan the original document, the rib is provided to at least one of a second side surface and a third side surface of the main body portion, and the second side surface and the third side surface of the housing, and a height of the rib in a thickness direction of the main body portion overlaps a height of the main body portion in the closed state.

19. The recording device according to claim 18, wherein the rib is covered by the second side surface and the third side surface of the housing in the closed state, the rib, in a side view from the first side surface of the housing, includes a flat surface parallel with the second side surface and the third side surface of the housing and an inclined surface continuous with an upper end portion or a lower end portion of the flat surface and having a distance from a surface supported by the rib that gradually increases as the distance from the flat surface increases.

20. A recording device, comprising:

a housing including a recording mechanism unit configured to perform recording on a target recording medium; and a recording mechanism unit cover configured to rotate, by a rotational shaft along a first side surface of the housing, between an open state of an upper surface of the housing being open and a closed state of the upper surface of the housing being closed, wherein a part of the recording mechanism unit cover is configured to be inside the housing in the closed state, a second side surface and a third side surface of the recording mechanism unit cover that intersect the first side surface of the housing in the closed state are provided with a rib configured to support a second side surface or a third side surface of the housing that intersects the first side surface of the housing, and the rib, in a side view from the first side surface of the housing, includes:

a flat surface parallel with the second side surface and the third side surface of the housing; and an inclined surface continuous with an upper end portion or a lower end portion of the flat surface and having a distance from a surface supported by the rib that gradually increases as a distance from the flat surface increases.

21. The recording device according to claim 20, wherein the second side surface and the third side surface of the housing are each integrally formed, the second side surface and the third side surface of the housing are each supported by a plurality of ribs in the closed state, and the plurality of ribs includes the rib.

22. The recording device according to claim 21, wherein when the recording mechanism unit cover is changed in position from the open state to the closed state, the second side surface and the third side surface of the housing are supported in sequence from the rib near the rotational shaft.

* * * * *